(12) United States Patent
Okano et al.

(10) Patent No.: US 7,054,067 B2
(45) Date of Patent: May 30, 2006

(54) THREE-DIMENSIONAL IMAGE OPTICAL SYSTEM

(75) Inventors: Fumio Okano, Tokyo (JP); Makoto Okui, Tokyo (JP); Jun Arai, Tokyo (JP); Masaki Kobayashi, Tokyo (JP)

(73) Assignee: Nippon Hoso Kyokai, Tokyo (JP)

( * ) Notice: Subject to any disclaimer, the term of this patent is extended or adjusted under 35 U.S.C. 154(b) by 70 days.

(21) Appl. No.: 10/849,504

(22) Filed: May 20, 2004

(65) Prior Publication Data

US 2004/0263964 A1    Dec. 30, 2004

(30) Foreign Application Priority Data

May 27, 2003  (JP) .............................. 2003-148916

(51) Int. Cl.
*G02B 7/10* (2006.01)

(52) U.S. Cl. ........................ 359/622; 359/625; 359/626

(58) Field of Classification Search ................ 359/644, 359/622, 625, 626

See application file for complete search history.

(56) References Cited

U.S. PATENT DOCUMENTS

| | | | | | |
|---|---|---|---|---|---|
| 5,650,876 | A | * | 7/1997 | Davies et al. ................ | 359/622 |
| 5,703,717 | A | * | 12/1997 | Ezra et al. ................... | 359/462 |
| 6,072,627 | A | * | 6/2000 | Nomura et al. ............. | 359/463 |

FOREIGN PATENT DOCUMENTS

| | | |
|---|---|---|
| JP | 10-62717 | 3/1998 |
| JP | 11-305164 | 11/1999 |
| JP | 2000-122191 | 4/2000 |

* cited by examiner

*Primary Examiner*—Scott J. Sugarman
(74) *Attorney, Agent, or Firm*—Armstrong, Kratz, Quintos, Hanson & Brooks, LLP (57) ABSTRACT

A three-dimensional image optical system including at least an elementary image optical subsystem constructed with plural afocal optical elements which include the first and the second optical components, wherein the plural afocal optical elements are aligned in a planar arrangement. The variety of the focal length to satisfy the afocal property is realized with the combination of the first optical components and the second optical components, that results in to provide the flexibility of the depth magnification, by which a remote observation is possible.

12 Claims, 9 Drawing Sheets

THREE-DIMENSIONAL IMAGE OPTICAL SYSTEM

CROSS REFERENCE TO RELATED APPLICATION

This application claims priority to Japanese Patent Application No. 2003-148916 filed on May 27, 2003, the contents of which are incorporated herein by reference.

BACKGROUND OF THE INVENTION

1. Field of the Invention

This invention relates to a three-dimensional image optical system that generates (presents) a three-dimensional optical image, specifically to an afocal three-dimensional image optical system to which an integral photography (IP) technology is applied.

2. Description of the Related Art

For one of the schemes for three-dimensional television that allows the three-dimensional vision from any of arbitrary viewing points, an IP (Integral Photography) three-dimensional camera device that uses a micro lens array apparatus or a pinhole array apparatus has been known. As one of applications of this IP three-dimensional system, a technology has been known wherein a radially graded refractive index rod lens (called a "radial GRIN lens", hereinafter) which has a particular optical length (for example, a Japanese published patent application, H12-122191). The three-dimensional camera device according to this patent application uses optical fibers instead of the radial GRIN lenses, wherein the effective optical length of the fiber is set a half cycle or an odd cycle of the meridional serpentine period and the graded refractive index of the optical fiber has the characteristic of quadratic distribution to maintain a coherent guided mode of the optical wave traveling therein.

As for the apparatuses that use micro lens array optical devices, facsimiles and related image display devices, which convert the letters and symbols displayed on a plane into a spatial image via equi-magnification erecting optical system (for example, a Japanese patent application, H10-062717), are well known. This image display device has plural lens plates on which many micro lenses are aligned and color plates which have arrayed holes, each locating to each micro lens, therein and work as a means to create a uniform colored background.

The radial GRIN lenses have already been known and have been applied to specific technical fields by using the equivalent optical characteristics to convex lens systems (for example, the reference 3).

References
Ref. 1; Japanese patent application, 2000-122191A
Ref. 2; Japanese patent application, H10-062717A
Ref. 3; Japanese patent application, H11-0305164A However the three-dimensional image optical systems used for the conventional three-dimensional camera device have the following problems.

In the above first and the third references, the depth magnification is fixed to be a negative unity or a positive unity and no change of the magnification of the reproduced image is possible because the system is constructed in such a way that the subject image is reproduced through the transmission guide which has a fixed afocal characteristic. In addition, the conventional three-dimensional optical image cannot be reproduced close to or far from the elementary image optical subsystem that reproduces the three-dimensional optical image. As the result, the conventional technology has problems in terms of the fixed and non-adjustable depth magnification.

In the second reference as given in the above, it is not possible to create a three-dimensional image but only a planar image. Moreover, because a means to create a uniform colored background is additionally necessary in order to image a planar image, more optical components are required in order to complete a set of the apparatus. It is not possible to display the subject as it is as a result of having a means of uniform colored background. The additional means of the uniform colored background is not intended to reproduce the three-dimensional images and has a different system design from those to generate three-dimensional images.

There have been no appropriate conventional technologies of the optical apparatus to satisfy the requirements to be used for the application for the case when radiation materials or explosive materials are handled by remote controlled manipulators or magic handles in nuclear power plants or power factories and for requirements such that visitors are able to see the art works and exhibits in close view even when they are forced to be apart from the exhibiting subjects in the museums.

The present invention has been proposed to solve the issues seen in the above. The purpose of the present invention is to provide a new three-dimensional image optical system that allows adjustment of the position of the three-dimensional optical image reproduced without fixing for the depth magnification of the subjects and allows to visually observe the subjects in detail at the location apart from the subjects without using a means of uniform colored background.

SUMMARY OF THE INVENTION

The three-dimensional image optical system according to the present invention has the following construction in order to achieve the purpose described above. That is, the elementary image optical subsystem is constructed with plural afocal optical elements that have the first optical component and the second optical component both aligned in a common optical axis. An optical converging point for both the first and the second optical component locates in the common optical axis so that afocal characteristics are obtained. If one of the optical components has no converging property but a diverting property then the virtual focal point may locate in the common optical axis as well. In this optical configuration, the plurality of afocal optical elements is placed in a planar array to form an elementary image optical subsystem. Then a plurality of the first optical components are aligned to form the first optical component plane and a plurality of the second optical components are aligned to form the second optical component plane.

Because the afocal optical element has the afocal property, the light emitted from a point of the subject travels to the spatial point of the other side of the afocal optical element and is then converged into a light point as an image point of the subject. Therefore, the afocal optical element has the capability to reproduce the light from the subject in the other side of the afocal optical element. Because the elementary image optical subsystem is composed of the plural afocal optical elements, the three-dimensional image of the subject which is placed in the side of the first optical component plane is reproduced in the side of the second optical component plane as an assembly of the image points covering the subject.

Because the light convergence or divergence property is required for the optical components, optical lenses such as convex lenses, concave lenses, radial GRIN lenses and cylindrical lenses are used other than the optical fiber lenses used for the conventional technology.

By using these optical lenses, the three-dimensional image optical system of the present invention can reproduce the three-dimensional images with advantages of the present invention such as magnification and close up capability of subjects.

The variation of the magnification of the three-dimensional image is designed by the focal distances of the first optical components and the second optical components in predetermined distances with a variety of ratios. In addition to the conventional magnification concept that is a depth magnification of the subject presented by the angle of the light to reproduce the three-dimensional image in the side of the second optical component plane, another magnification concept that is a depth magnification regarding the three-dimensional virtual image is provided. Therefore, it is possible to reproduce the magnified or shrunk image of the subject and to reproduce the image of the subject in non-facing orientation. This is a new technology of image reproduction called a"depth-reverse image".

The present invention has further advantage of providing a reproduced image of the subject in a horizontal direction but a diverted image as is from the original subject in the vertical direction by using cylindrical lenses.

The afocal optical element may be composed of a pair of a convex lens and a concave lens. By this configuration, a new depth magnification, that is a different sign of magnification from the conventional technology, is possible.

The present invention has a further advantage that the focal point from the radial GRIN lens, that is called the focal distance hereinafter, can be varied by selecting the length of the radial GRIN lens. Therefore, it is possible to make a variation of depth magnification by designing the length of the radial GRIN lens and setting the location of a pair of the radial GRIN lenses. In this designing practice, it is possible that the radial GRIN lens located in the first optical component works as a convex lens and that in the second optical component as a concave lens. Therefore, the new depth magnification, that is a different sign of magnification from the conventional technology, is possible as well.

As for the specific design of the length of radial GRIN lenses, meridiaonal serpentine light path is the major design parameter. The ruling dimension of the light path is a serpentine period provided by $P=2/A^{1/2}$ where A is a coefficient given by the material of the radial GRIN lens. In more detail, the radial GRIN lens works as a convex lens and a concave lens when the optical lengths of the radial GRIN lens $0<Zu<P/2$ and $P/2<Zu<P$, respectively.

The present invention has a further advantage in reproducing a clear image by adding optical gobo element which has the gobo effect to the holder that holds the first and the second optical components.

The present invention has another further advantage in reproducing the image of the subject in depth-reverse images by using two or even quantity of the elementary image optical subsystem.

The afocal optical element of the present invention can be designed in a negative angular magnification. Then the reproduced image against the subject becomes a depth-reverse image in such an angular magnification scheme.

DETAILED DESCRIPTION OF THE EXEMPLARY EMBODIMENTS

Figure 1:
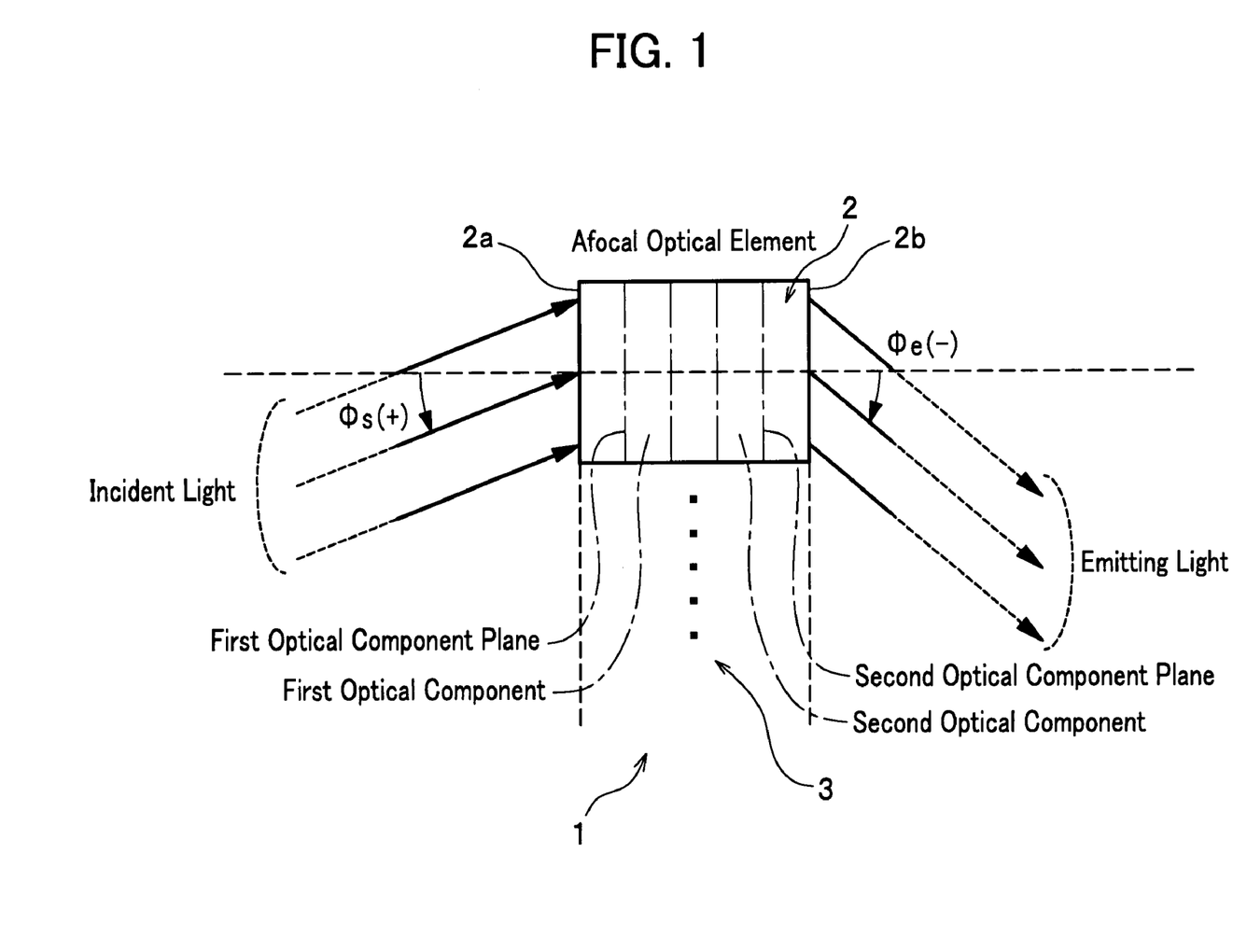
FIG. 1 is a schematic that shows a side view of an afocal optical element and an elementary image optical subsystem used for the three-dimensional image optical system according to the present invention.
Figure 2:
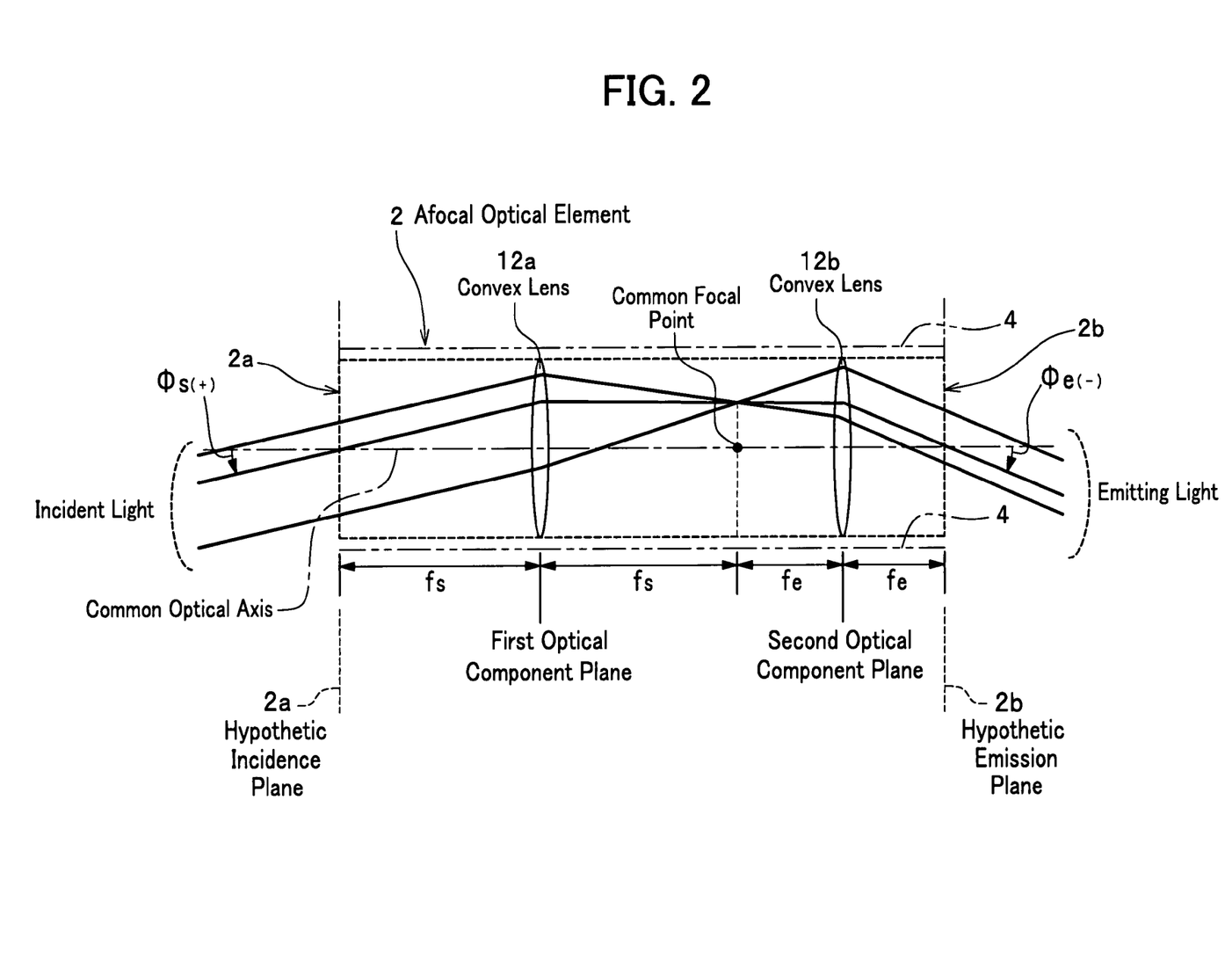
FIG. 2 is a schematic that shows the principle of an afocal optical element configured with two convex lenses for the use of the three-dimensional image optical system according to the present invention.
Figure 3:
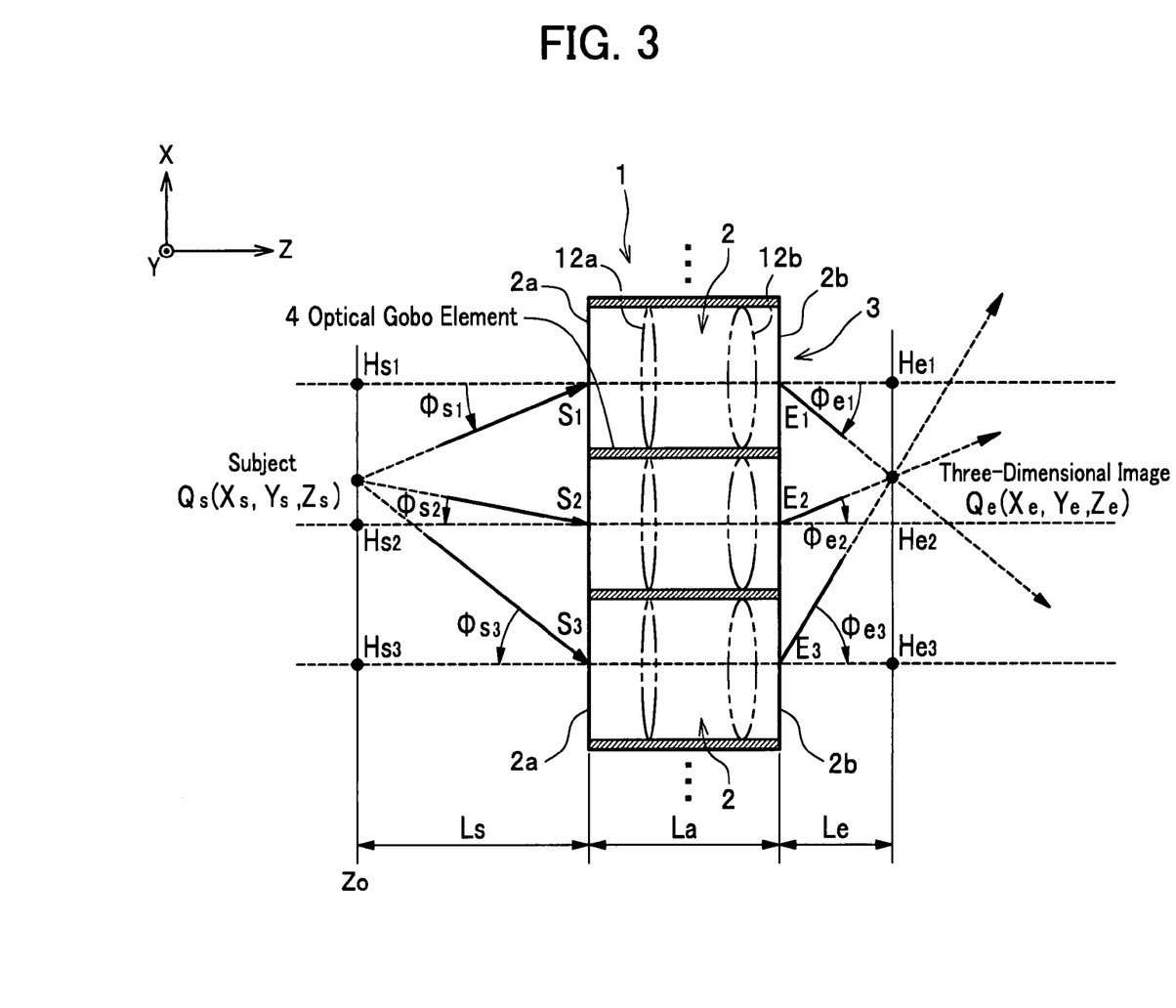
FIG. 3 is a schematic that shows a cross sectional view of the principal portion of the elementary image optical subsystem (wherein two convex lenses are used) used for the three-dimensional image optical system according to the present invention.

Several embodiments according to this invention will be explained in detail with reference to the drawings. FIG. 1 shows a principal side view of an afocal optical element used for the three-dimensional image optical system. FIG. 2 shows the principle of an afocal system configured with convex lenses for use for the three-dimensional image optical system of the present invention. FIG. 3 shows a cross sectional view of the principal portion of the three-dimensional image optical system.

Figure 6:
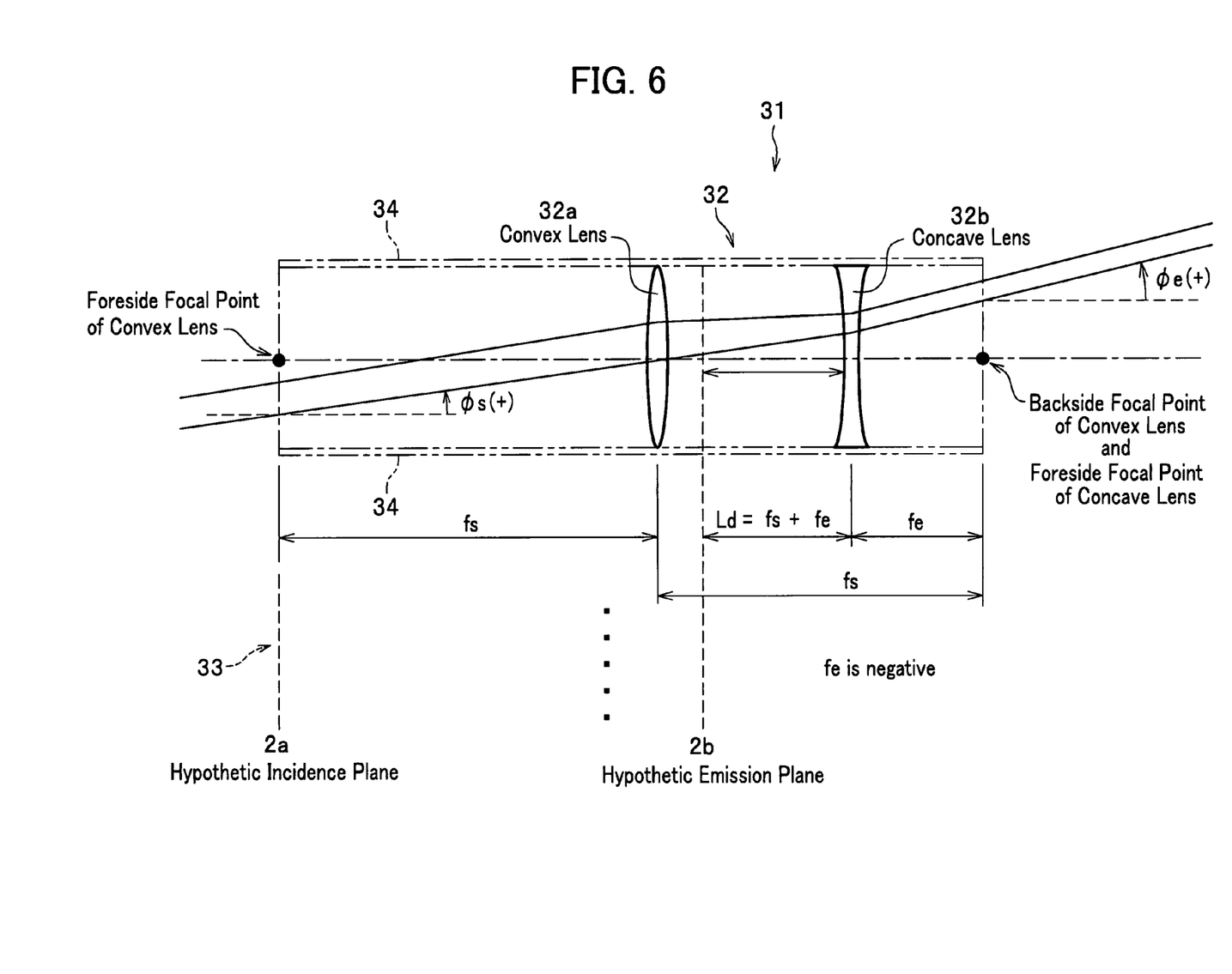
FIG. 6 is a schematic that shows the principle of an afocal element configured with a convex lens and a concave lens for use for the three-dimensional image optical system according to the present invention.

The three-dimensional image optical system 1 regarding the present invention comprises an elementary image optical subsystem 3 which is composed of plural afocal optical elements 2 which are aligned in a planar array. The afocal optical element 2 is composed of the first optical component and the second optical component, both of which are aligned on a common optical axis. The focal distances of the first and the second optical components can be same or different. However, the first and the second optical components have a common focal point on the common optical axis. For the optical characteristics of this elementary image optical subsystem 3, the first optical component plane and the second optical component plane at the location of the first optical component and the second optical component are defined. They are the symmetrical planes for the convex lenses 12a and 12b, as shown in FIG. 2. Another set of optical characteristics is a hypothetic incidence plane 2a and a hypothetic emission plane 2b which are shown in FIG. 2. For the system of two convex lenses, the hypothetic incidence plane 2a and the hypothetic emission plane 2b are defined by the forward focal points of the first optical components and the back focal points of the second optical components, respectively. The common focal point is located between the first optical component and the second optical component on the optical axis. For the system of the afocal optical element wherein a convex lens and a concave lens are used, the hypothetic emission plane 2b is located between the convex lens and the concave lens, as shown in FIG. 6. The common focal point locates in the reverse side of the subject from the concave lens.

The afocal properties of the afocal optical element regarding the present invention is not only constructed by the two convex lenses commonly seen in the conventional technologies but two cylindrical lenses, a pair of a convex lens and the concave lens and two radial GRIN lenses.

The first embodiment of the present invention will be explained wherein two convex lenses are used as shown in FIG. 2.

As shown in FIG. 2, two convex lenses 12a and 12b are located on a common optical axis with the separation length $f_s+f_e$ which is a summation of the focal distances of the convex lenses 12a and 12b, respectively. The hypothetic incidence plane 2a and the hypothetic emission plane 2b are in the distance $f_s$ of the convex lens 12a from the first optical component plane and in the distance $f_e$ of the convex lens 12b from the second optical component plane.

In this optical configuration, a light from a subject locating in the infinity distance comes into the afocal optical element 2 with the incident angle $\phi_s$, then the emission angle $\phi_e$ is obtained as shown in FIG. 2. The depth magnification is obtained by the incident angle $\phi_s$ and the emission angle $\phi_e$. The three-dimensional image is reproduced by convergence of the lights radiating from a subject Qs into an image point Qe, wherein the elementary image optical subsystem 3 covers large amount of the radiating lights from the subject Qs. Because the incident angle $\phi_s$ and the emission angle $\phi_e$ are different in sign, the reproduced three-dimensional image by the elementary image optical subsystem 3 provides a depth-reverse image against the subject. The three-dimensional property of the reproduced image is generated by the plural quantities of the elementary image optical subsystems 3 that provide the viewing angle to cover the lights emitted from the subject.

The second embodiment of the present invention will be explained by FIG. 3, wherein the magnification of the reproduced image of the subject can be different from unity. As shown in FIG. 3, the following explanation is possible for the case that the subject Qs is placed against the afocal optical element 2 in the distance of several tens times of the diameter of the afocal optical element 2.

All lights from the subject Qs to the hypothetic incidence plane 2a are approximately parallel to the optical axis of the elementary image optical subsystem 3. However, more exactly, the incident angles are non-zero as $\phi_s^1$ to $\phi_s^3$ as shown in FIG. 3 and have a relation with the emission angle $\phi_e$ at the emission plane 2b at the location side of the afocal optical element 2 with an angular magnification $\gamma$ as given by the following equation;

$$\gamma = \frac{\tan\phi_e}{\tan\phi_s}. \tag{1}$$

As shown in FIG. 3, many of the afocal optical elements 2 are arranged to compose an array of the elementary image optical subsystem 3. Then, the lights from the subject Qs (at the 3D position $(X_s, Y_s, Z_s)$) which locates at the distance of $L_s$ from the array of the elementary image optical subsystem 3 is focused and a three-dimensional image is reproduced at the distance $L_e$ from the backside plane of the array. The position of Qe is given by the equation (2).

$$X_s = X_e \text{ and } Y_s = Y_e \tag{2}$$

where, the original point of the coordinates of $Z_s=0$ is assumed. The relation between the distance $L_s$ and $L_e$ is given by the equation (3). By considering planar geometric relation, the equations (4) and (5) are obtained by the equation (3). In the equations (4) and (5), $H_{s1}, \ldots, H_{sn}$ are the distances from the optical axis in the plane including the subject Qs and perpendicular to the axis and $H_{e1}, \ldots, H_{en}$ are the distances from the optical axis in the plane including the intermediate three-dimensional image Qe and being perpendicular to the optical axis. The equations are;

$$\frac{L_e}{L_s} = \frac{\tan\phi_{sn}}{\tan\phi_{en}} = \frac{1}{\gamma} \tag{3}$$

$$H_{s1}Q_s = |L_s\tan\phi_{s1}| = \left|L_e\frac{\tan\phi_{e1}}{\tan\phi_{sn}}\tan\phi_{s1}\right| = |L_e\tan\phi_{e1}| = H_{e1}Q_e \tag{4}$$

$$H_{sn}Q_s = |L_s\tan\phi_{sn}| = \left|L_e\frac{\tan\phi_{e1}}{\tan\phi_{sn}}\tan\phi_{sn}\right| = |L_e\tan\phi_{en}| = H_{en}Q_e \tag{5}$$

As prescribed by these equations, the position of the subject Qs and the intermediate three-dimensional image Qe coincide without discrepancy and it is understood the equation (2) is satisfied. The depth magnification $M_p$ of the subject Qs by the elementary image optical subsystem 3 is given by the following equation (6).

$$M_p = \frac{\Delta L_e}{\Delta L_s} = \frac{1}{\gamma} \tag{6}$$

The depth magnification $M_p$ given by the equation (6) is a reciprocal of the angular magnification $\gamma$. Therefore, it is possible to obtain a desired depth magnification by changing the angular magnification. When the subject Qs is located apart from the hypothetic incidence plane 2a of the elementary image optical subsystem 3, the intermediate three-dimensional image Qe is reproduced at the place apart from the hypothetic emission plane 2b with the same amount of distance. Therefore the subject Qs and the intermediate three-dimensional image Qe have a reverse relation in the distance from the hypothetic incidence plane 2a and the hypothetic emission plane 2b, respectively. In other words, viewing the subject Qs from the elementary image optical subsystem 3, the intermediate three-dimensional image Qe is reproduced in reverse depth, that is, a reverse viewing image.

In the equation (6), the quantities $\Delta L_e$ and $\Delta L_s$ imply the derivations of the distance regarding the subject and the reproduced image, respectively.

As shown in FIG. 2 and FIG. 3, a design such that the three-dimensional image optical system 1 has a single elementary image optical subsystem 2 and can reproduce a reverse viewing intermediate three-dimensional image Qe of the subject Qs as a result of negative depth magnification has been explained.

Figure 4:
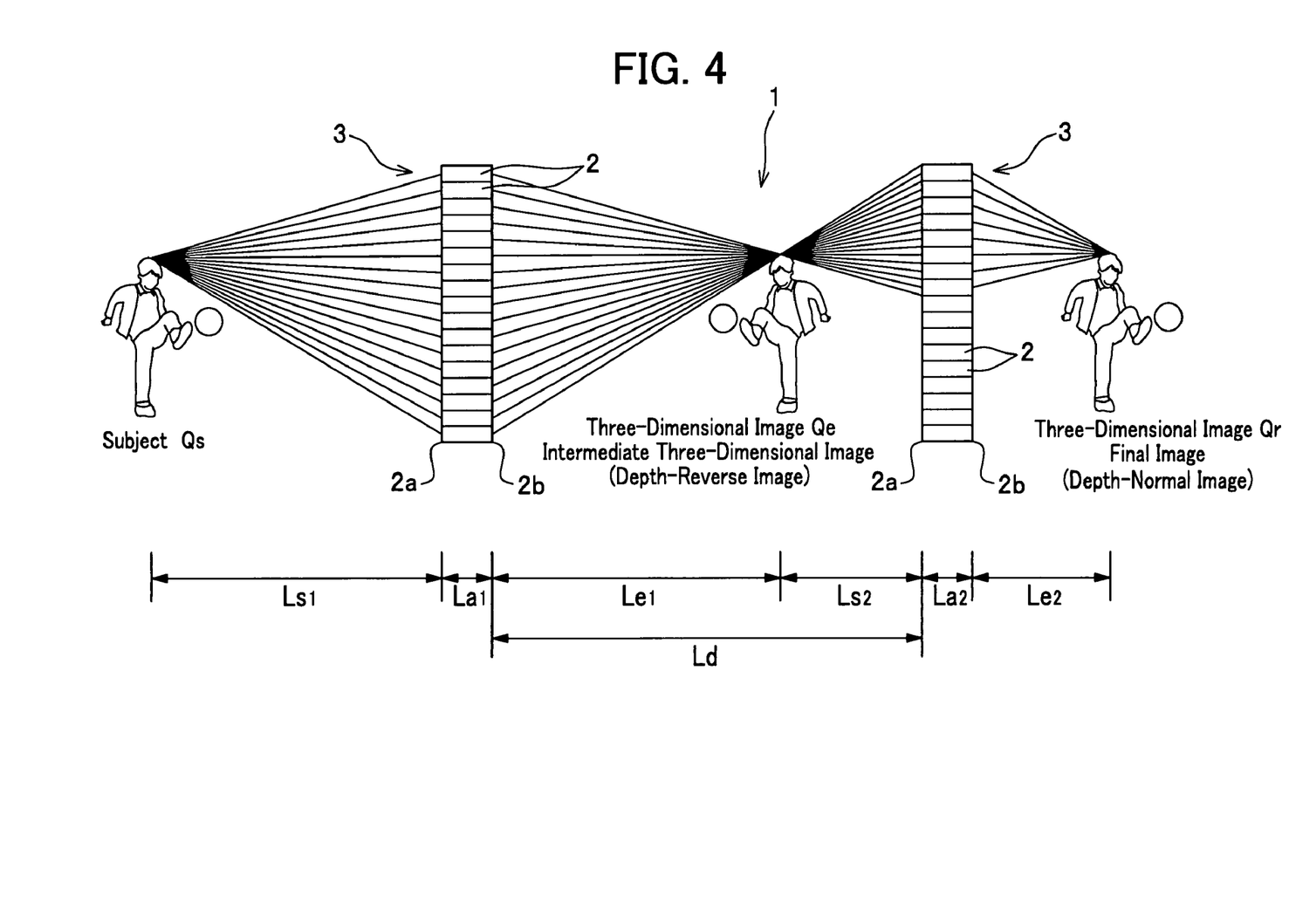
FIG. 4 is a schematic that shows a three-dimensional image optical system configured with two elementary image optical subsystems.

The third embodiment of the present invention will be further explained where a new effect of employing the plural elementary image optical subsystem 3 is obtained. The system of the optical design is shown in FIG. 4 wherein two units (referred to as "the first reverse viewing optical system" and "the second reverse viewing optical system") of elementary image optical subsystems 3 are used with being placed in a separated distance but with the same optical axis is allowed. By using this three-dimensional image optical system, a depth correct image Qr can be finally reproduced. In this embodiment, it is preferred that the alignment of the plural elementary image optical subsystems 3 is in-line such that the optical axes of the afocal elements therein are parallel and the central axis of each elementary image optical subsystem 3 is in the same axis.

As shown in FIG. 4, the first elementary image optical subsystem 3 reproduces the intermediate three-dimensional image Qe of the subject Qs locates at the distance $\Delta L_{e1}$ and the second elementary image optical subsystem 3 reproduces the three-dimensional optical image Qr of the intermediate three-dimensional image Qe at the distance $\Delta L_{s2}$, respectively, and the distance $\Delta L_{e1}$ and the distance $\Delta L_{s2}$ be mutually different.

The three-dimensional image optical system 1 can have 2 units (or 2n units, where "n" is a natural number) has two elementary image optical subsystems 3 and the depth reverse is taken twice, therefore can remove the depth reverse. The depth magnification $M_c$ is given by $$M_c = (M_p)^2 = \frac{1}{\gamma^2}. \tag{7}$$

As shown in FIG. 3, the incidence angle $\phi^s$ and the emitting angle $\phi_e$ have the same magnitude but reverse sign in the three-dimensional image optical system 1. Therefore, the same depth correct image Qr is reproduced against the subject Qs by using 2n ("n" is a natural number) units of the elementary image optical subsystems. Moreover, by differing the incident angle and the launching angle, it is possible to change the image position of the intermediate three-dimensional images Qe and the Qr.

The three-dimensional image is reproduced by the convergence of the lights radiating from a subject Qs into an image point Qe, wherein the elementary image optical subsystem 3 covers large amount of the radiating lights from the subject Qs. Because the three-dimensional image optical system 1 reproduces the three-dimensional image with the emission angle which is different from the incident angle, the distance of the reproduced three-dimensional image from the second optical component plane is different from the distance of the subject from the first optical component plane. However, these distances are the same when the depth magnification is negative unity.

As explained above, it is possible to reproduce the intermediate three-dimensional images Qe and Qr which have the horizontal and vertical parallaxes as shown in FIG. 2 and FIG. 4. In the three-dimensional image optical system 1 as shown in FIG. 2 and FIG. 3, it is possible to clearly image the intermediate three-dimensional images Qe and Qr by conforming an optical gobo element 4 such as an optical filter and a thin film to cutoff the light between the afocal optical elements 2. The optical gobo element 4 is arranged so as to surround the afocal optical elements 2.

The optical gobo element 4 can be formed by a junction film between adjacent afocal optical elements 2 or by an adhesive layer to bind the adjacent afocal optical elements 2. The three-dimensional image optical system 1 can more clearly reproduce the intermediate three-dimensional image Qe and Qr that because the optical gobo element 4 cuts the blurred light caused by the scattering of the light traveling in the afocal optical elements 2.

The afocal optical element using the convex lenses 12a and 12b as shown in FIG. 2 is a Keplerian system and reproduces the depth-reverse image and the angular magnification $\gamma$ and the depth magnification $M_p$ is given by the equations (8) and (9). $\Delta L_e$ and $\Delta L_s$ are the small variation of $L_e$ and $L_s$, respectively, as $$\gamma = \frac{\tan\phi_e}{\tan\phi_s} = \frac{f_s}{f_e} \tag{8}$$

$$M_p = \frac{\Delta L_e}{\Delta L_s} = \frac{1}{\gamma} = -\frac{f_e}{f_s}. \tag{9}$$

As shown in FIG. 4, the three-dimensional image optical system 1 can reproduce the intermediate three-dimensional images Qe and Qr which have a horizontal parallax and the vertical parallax. The depth magnification $M_c$ of the three-dimensional Qr is given by the equation (10).

$$M_c = (M_p)^2 = \frac{1}{\gamma^2}. \tag{10}$$

For the adjustment of the focal length, it is possible of exchange one of the convex lenses 12a and 12b with another convex lens in this elementary image optical subsystem 3 which is composed of the convex lenses 12a and 12b as afocal optical elements 2. For such exchanging of one of the two convex lenses, the optical gobo element 4 is divided into two portions (not shown in the figures) at the focal point and the elementary image optical subsystem 3 is configured such that two halves of the desired elementary image optical subsystem 3 are fixed but possible in dismounting and mounting with keeping to face each other.

Figure 5:
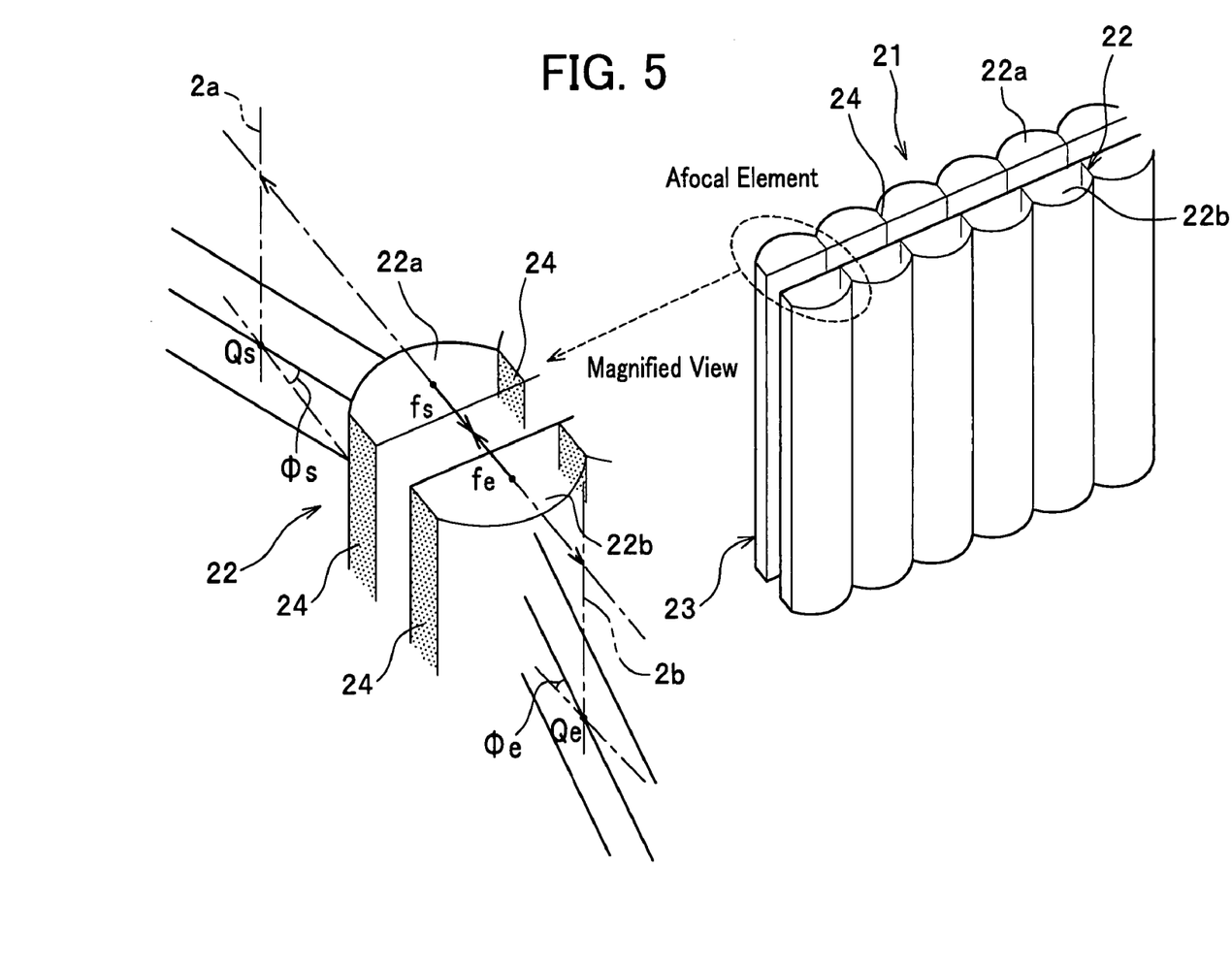
FIG. 5 is a schematic that shows a perspective view of the three-dimensional image optical system wherein the afocal optical element is composed of cylindrical lenses.

The fourth embodiment of the present invention as shown in FIG. 5 will be further explained. The three-dimensional image optical system 21 can be configured to have only horizontal parallax (or only vertical parallax) that reproduces a three-dimensional image. FIG. 5 shows a perspective drawing of the three-dimensional image optical system constructed with an afocal optical element composed of the cylindrical lenses. This three-dimensional image optical system 21 is constructed in a way such that the cylindrical surface (or the planer surface) of the cylindrical lens 22 at the incidence plane of the elementary image optical subsystem 3 and another cylindrical lens is placed to keep the same optical axis in a setting of afocal optical element 22 such that the focal position with the focal length $f_s$ of the cylindrical lens 22a is another focal position of the cylindrical lenses 22b with the focal length $f_e$. The hypothetic incidence plane 2a and hypothetic emission plane 2b are the planes defined by the focal distances of the cylindrical lens 22a and the cylindrical lenses 22b.

This afocal optical element 22 is assembled in such a construction that the all cylindrical lenses 22a are aligned to coincide with a plane at the sides of the planar surfaces of the cylindrical lenses 22a as well as the cylindrical lenses 22b which compose of the elementary image optical subsystem 3. In this assembly of the elementary image optical subsystem 3, it is possible to cut undesirable light in imaging the intermediate three-dimensional image Qe (or Qr) and reproduce a clear image by forming the optical gobo element 24 on the adjacent surface of the afocal optical elements aligned in a plane. The optical gobo element 24 cuts the scattering of the light traveling in the afocal optical elements 2.

This three-dimensional image optical system 21 can reproduce a three-dimensional optical image Qr (shown in FIG. 4) with the 2n ("n" is a natural number) units aligned in a focal position and with the same depth (that is called "a depth-normal image") by elementary image optical subsystem 23 in the case when the afocal optical element 22 has a negative angular magnification. The three-dimensional image optical subsystem that has the cylindrical lenses 22a and 22b has the angular and the depth magnifications as given by equations (8) and (9), respectively. The depth magnification $M_c$ for the case of using 2n units of the elementary is obtained by the equation (10).

The fifth embodiment of the present invention will be explained, wherein a different combination of the first and the second optical components are employed. As explained above, the three-dimensional image optical systems 1 and 21 are configured with convex lenses 12a and 12b or cylindrical lenses 22a and 22b to conform to the afocal system. However, it is possible to configure the afocal system with a convex lens and a concave lens. FIG. 6 shows such an afocal system that is similar to a Galilean telescopic lens system. The common focal point of this afocal system is provided by the back focal point of the convex lens which is the first optical component and the virtual focal point of the concave lens which is the second optical component wherein the front focal point is given by the back side thereof, as shown in FIG. 6. The hypothetic incidence plane 2a locates in the front focal point of the convex lens 32a and the hypothetic emission plane 2b in the back virtual focal point of the concave lens 32b which is actually in the foreside of the concave lens 32b. The plural afocal optical elements 32 of such lens configuration which is aligned in a planar array provides another elementary image optical subsystem 33 that functions another elementary image optical subsystem 33 and a three-dimensional image optical system 31. A feature of the three-dimensional image optical systems 31 using this afocal system is to reproduce a depth-normal image.

The image of the subject is not reproduced in this afocal system because the concave lens 32b which is the second optical component has no optical convergence capability. However, the second optical component generates an apparent image in the virtual focal point as the property of a concave lens 32b. The angular magnification and the depth magnification are compliant to the equation (8) using $\phi_s(+)$ and $\phi_e(+)$, therefore it should be noted that the depth magnification is positive.

For the three-dimensional image optical system 1 as shown in FIG. 4 can be constructed by using the plural elementary image optical subsystems 33. For this case the hypothetic emission plane of the first elementary image optical subsystem 33 coincides with the hypothetic incidence plane of the second elementary image optical subsystem 33. In this series of the chain of the afocal system can transport the stereo image to an observer.

Figure 7:
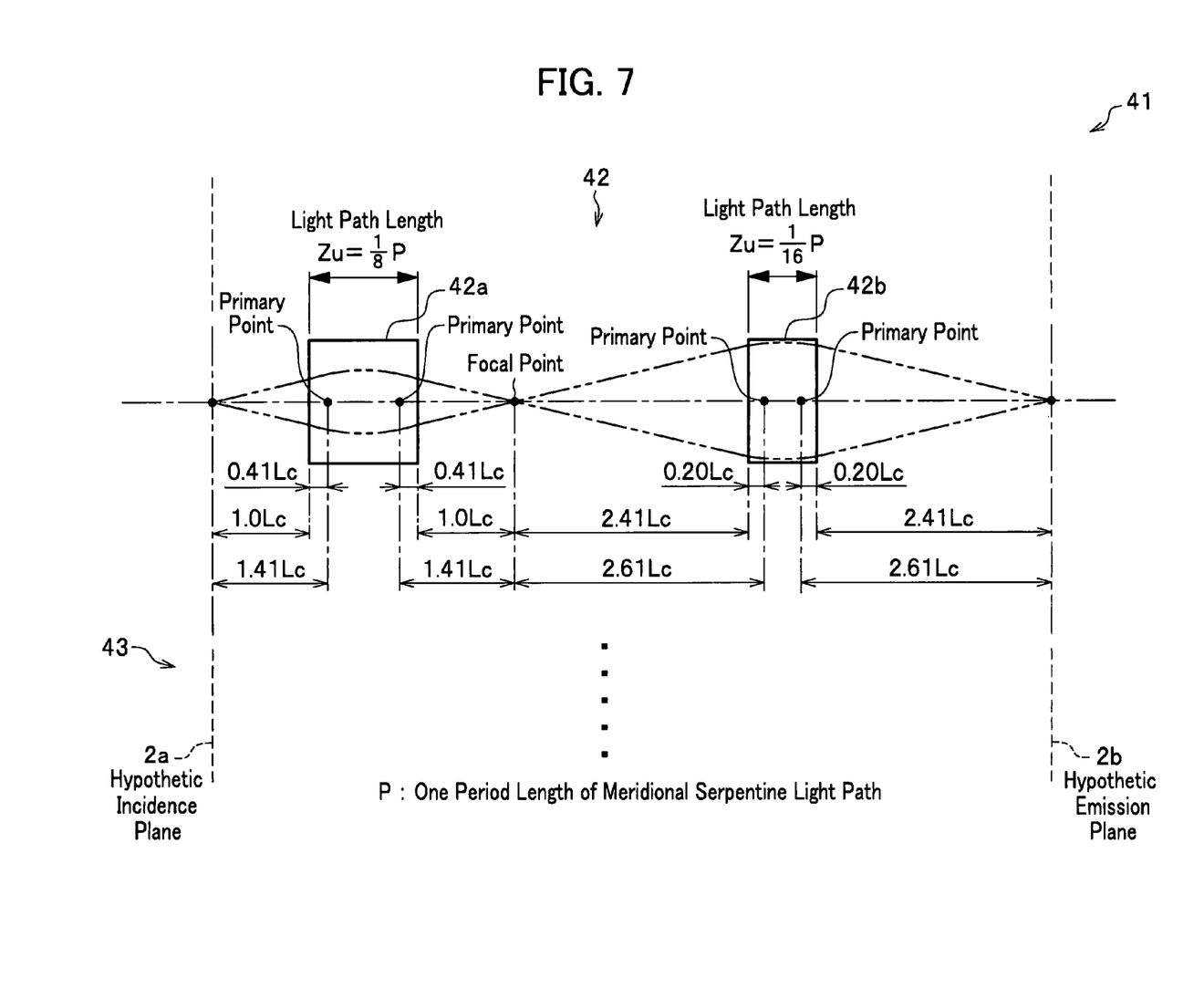
FIG. 7 is a schematic that shows the principle of an afocal element configured with two radial GRIN lenses for use for the three-dimensional image optical system according to the present invention.
Figure 8:
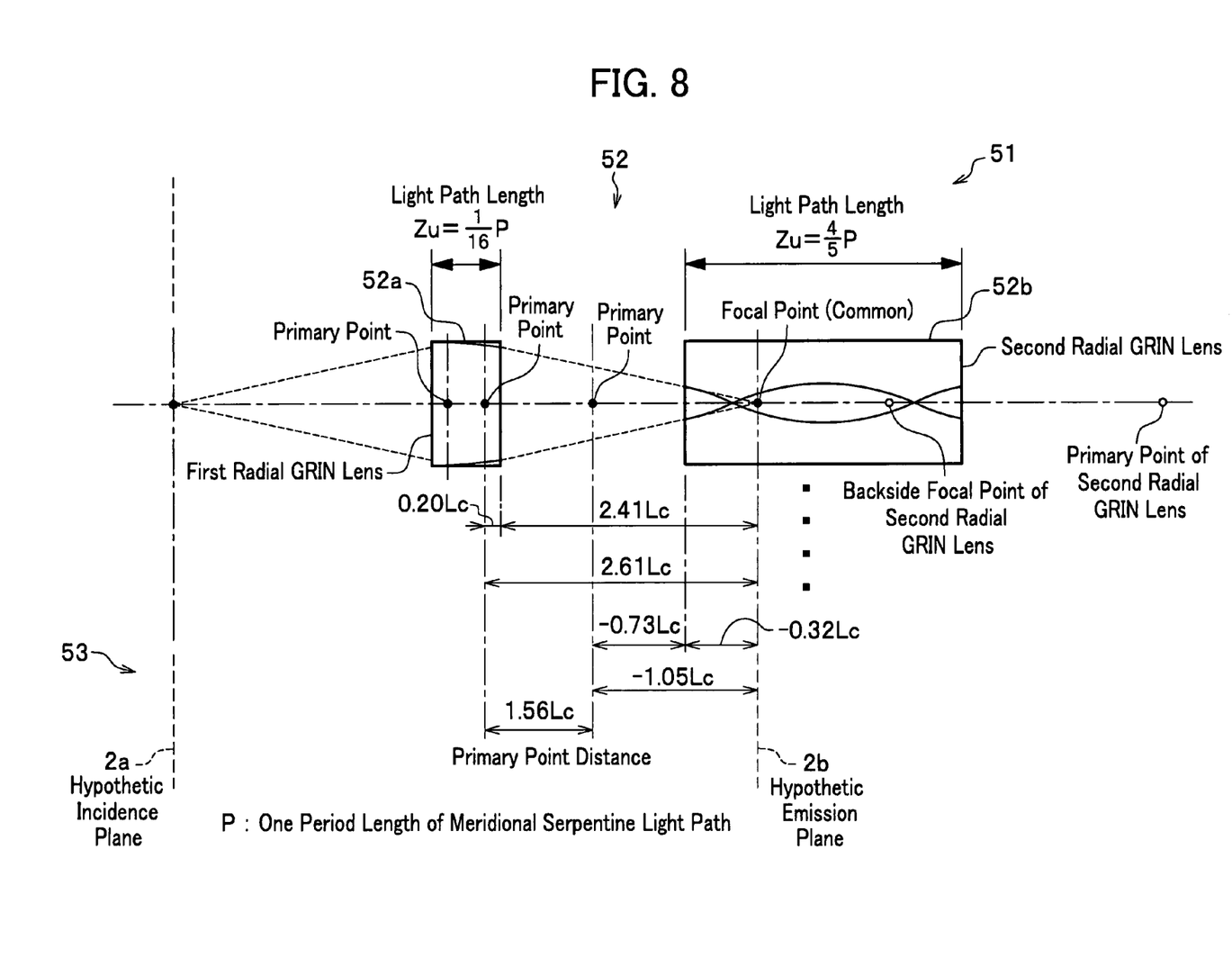
FIG. 8 is a schematic that shows the principle of another afocal element configured with two radial GRIN lenses for use for the three-dimensional image optical system according to the present invention.

The sixth embodiment of the present invention will be explained wherein new optical components using a distributed index in the mother glass are used. According to the availability of variation of the lenses, the optical components are not confined to be convex lenses or concave lenses but Radial GRIN lenses can be used. One of the features of radial GRIN lenses is the ease of mounting for assembly. FIG. 7 is a schematic that shows the arrangement of the optical components and FIG. 8 shows the detail dimensional design to achieve the afocal system. As shown in FIG. 7, the first radial GRIN lens 42 and the second radial GRIN lens 42b are used for the first optical component and the second optical component. These two radial GRIN lenses 42a and 42b are separately aligned in the common optical axis so that the focal points of the first and the second radial GRIN lenses 42a and 42b coincide at the common focal point locating on the common optical axis. The afocal optical element 43 comprises these two radial GRIN lenses 42a and 42b and plural afocal optical elements arranged in a planar array construct the elementary image optical subsystem 43.

The radial GRIN lens 42a has a distributed refractive index n given by eq. (11). The distribution of the refractivity is large in the center and small in the periphery. Once a meridional serpentine period P ($=2\pi/A^{1/2}$) is defined as a normalized period length θ, one of designs for the separation length of the first and the second radial GRIN lenses is under the condition as 0>θ>½. For a particular design of the present invention, the first radial GRIN lens 42a has θ=⅛ and the second radial GRIN lens 42b has θ=1/16. Then the physical design of the afocal system can be designed by the equation (11) to (13) and the separation of the two radial GRIN lenses are design as shown in FIG. 7.

$$n = n_0 \sec h(\sqrt{A}\, r) \tag{11}$$

$$= n_0 \left\{ 1 - \frac{A}{2} r^2 + \frac{5}{6}\left(\frac{A}{2}\right)^2 r^4 - \ldots \right\}$$

$$\cong n_0 \left(1 - \frac{A}{2} r^2\right)$$

$$\theta = \sqrt{A}\, Z_u = 2\pi \times \frac{1}{8} = \frac{\pi}{4} \tag{12}$$

$$f_1 = f_2 = \frac{1}{n_0 \sqrt{A} \sin\frac{\pi}{4}} = \frac{1.41}{n_0 \sqrt{A}} = 1.41 L_c$$

$$h_1 =$$

$$h_2 = \frac{1}{n_0 \sqrt{A}} \tan\frac{\theta}{2} = \frac{1}{n_0 \sqrt{A}} \tan\frac{\pi}{8} = \frac{041}{n_0 \sqrt{A}} = 0.41 L_c$$

$$s_1 = s_2 = \frac{1}{n_0 \sqrt{A} \tan\theta} = \frac{1}{n_0 \sqrt{A} \tan\frac{\pi}{4}} = \frac{1}{n_0 \sqrt{A}} = L_c$$

$$\theta = \sqrt{A}\, Z_u = 2\pi \times \frac{1}{16} = \frac{\pi}{8} \tag{13}$$

$$f_1 = f_2 = \frac{1}{n_0 \sqrt{A} \sin\frac{\pi}{8}} = \frac{2.61}{n_0 \sqrt{A}} = 2.61 L_c$$

$$h_1 =$$

$$h_2 = \frac{1}{n_0 \sqrt{A}} \tan\frac{\theta}{2} = \frac{1}{n_0 \sqrt{A}} \tan\frac{\pi}{16} = \frac{0.20}{n_0 \sqrt{A}} = 0.20 L_c$$

$$s_1 = s_2 = \frac{1}{n_0 \sqrt{A} \tan\theta} = \frac{1}{n_0 \sqrt{A} \tan\frac{\pi}{8}} = \frac{2.41}{n_0 \sqrt{A}} = 2.41 L_c$$

where, $$\theta = (Z_u / P) \cdot 2\pi = A^{1/2} \cdot Z_u \text{ and } L_c \text{ is defined as } L_c = \frac{1}{n_0 \sqrt{A}}.$$

The parameter n is the refractive index of the radial GRIN lens where r is the position of the radius from the optical axis and $n_0$ is the refractive index at the optical axis. The parameter A is determined by the material of the radial GRIN lens, $f_1$ and $f_2$ the focal lengths, $h_1$ and $h_2$ the principal plane locations and $s_1$ and $s_2$ the distances from the terminal surfaces to the outside focal points.

For this three-dimensional image optical system 41, two optical components are constructed by the radial GRIN lenses 42a and 42b where the focal length is determined by the length thereof. By using these radial GRIN lenses 42a and 42b, therefore, it is possible to configure a similar three-dimensional image optical systems 1 as shown in FIG. 1, FIG. 2, FIG. 3 and FIG. 4, regardless to the angular magnifications of the afocal optical element 2.

By using the radial GRIN lenses, it is possible to construct the afocal optical element 32 as shown in FIG. 4 where a convex lens and a concave lens are employed. The detail design is explained with the reference to FIG. 8. The afocal system comprises the first radial GRIN lens 52a and the second radial GRIN lens 52b which are compliant to the equation (11) and (14), respectively. The meridional serpentine period P ($=2\pi/A^{1/2}$) as a period length $\theta$ is conditioned to the first radial GRIN lens 52a with $0>\theta>\frac{1}{2}$ and to the second radial GRIN lens 52b with $\frac{1}{2}>\theta>1$. Period lengths $\theta=\frac{1}{16}$ (same as shown in eq. (12)) and $\theta=\frac{4}{5}$ are selected for the first and the second radial GRIN lenses 52a and 52b, respectively.

$$\theta = \sqrt{A} Z_u = 2\pi \times \frac{4}{5} = \frac{8\pi}{5} \tag{14}$$

$$f_1 = f_2 = \frac{1}{n_0\sqrt{A}\sin\frac{8\pi}{5}} = \frac{-1.05}{n_0\sqrt{A}} = -1.05L_c$$

$$h_1 = h_2 = \frac{1}{n_0\sqrt{A}}\tan\frac{\theta}{2} = \frac{1}{n_0\sqrt{A}}\tan\frac{4\pi}{5} = \frac{-0.726}{n_0\sqrt{A}} = -0.73L_c$$

$$s_1 = s_2 = \frac{1}{n_0\sqrt{A}\tan\theta} = \frac{1}{n_0\sqrt{A}\tan\frac{8\pi}{5}} = \frac{-0.32}{n_0\sqrt{A}} = -0.32L_c$$

The parameter A is determined by the material of the radial GRIN lens, $f_1$ and $f_2$ the focal lengths, $h_1$ and $h_2$ the principal plane location and $s_1$ and $s_2$ the distances from the terminal surfaces to the outside focal points.

The lengths of the radial GRIN lenses 52a and 52b are adjusted to obtain the functions as a convex lens and a concave lens, respectively. Similar to the three-dimensional image optical system 41 as shown in FIG. 6, a positive depth magnification can be obtained with non-unity or unity magnitude of magnification. Therefore, the three-dimensional optical image which has no reverse convex and concave relations with the subject image along the optical axis is reproduced in a depth-normal image.

The three-dimensional image optical systems 31, 41, 51 as shown by FIGS. 6, 7 and 8 can adopt an optical gobo element 34 which has a gobo effect. By using the optical gobo element, the light scatter at an afocal optical element does not go into the adjacent afocal optical elements. Therefore, the cross over of the lights is suppressed and clear intermediate three-dimensional images Qe and Qr are obtained. The optical gobo elements 4 and 34 can be a cylindrical circumference to the afocal optical element 2 and 32. The cement to assemble the afocal optical element to construct the elementary image optical subsystem 3 and the mounting frame of the afocal optical element 2 and 32 can be gobo effect materials.

The angular magnification and the depth magnification for the three-dimensional image optical systems 31, 41 and 51 are determined by eqs. (8) and (9). The depth magnification for the series use of two elementary image optical subsystem 33, 43 or 53 is given in eq. (10).

As explained above, the three-dimensional image optical system 1 and 21, 31, 41 and 51 can be applied to the following technical fields. For example, for the case of using a magic hand to handle the harmful radio active materials, a three-dimensional image display means configured by the three-dimensional image optical system 1 and 21 can assist the operators to see the three-dimensional image in an enlarged size close to the operator position.

By using the three-dimensional image optical system 1, 21 or 41 for a part or the whole of the show windows of shops or department stores, the commercial goods located inside the show window can be imaged out of the show windows so that the exhibition for the commercial goods can be strikingly stood out. An "eye-catching" effect can be expected for the use of the present invention.

In case of the museums and art museums to show a precious exhibit, it is necessary to keep the visitors a certain distance away from the exhibit. The three-dimensional image optical system 1 (or 21) allows the visitors to see the exhibit in a close position.

Figure 9:
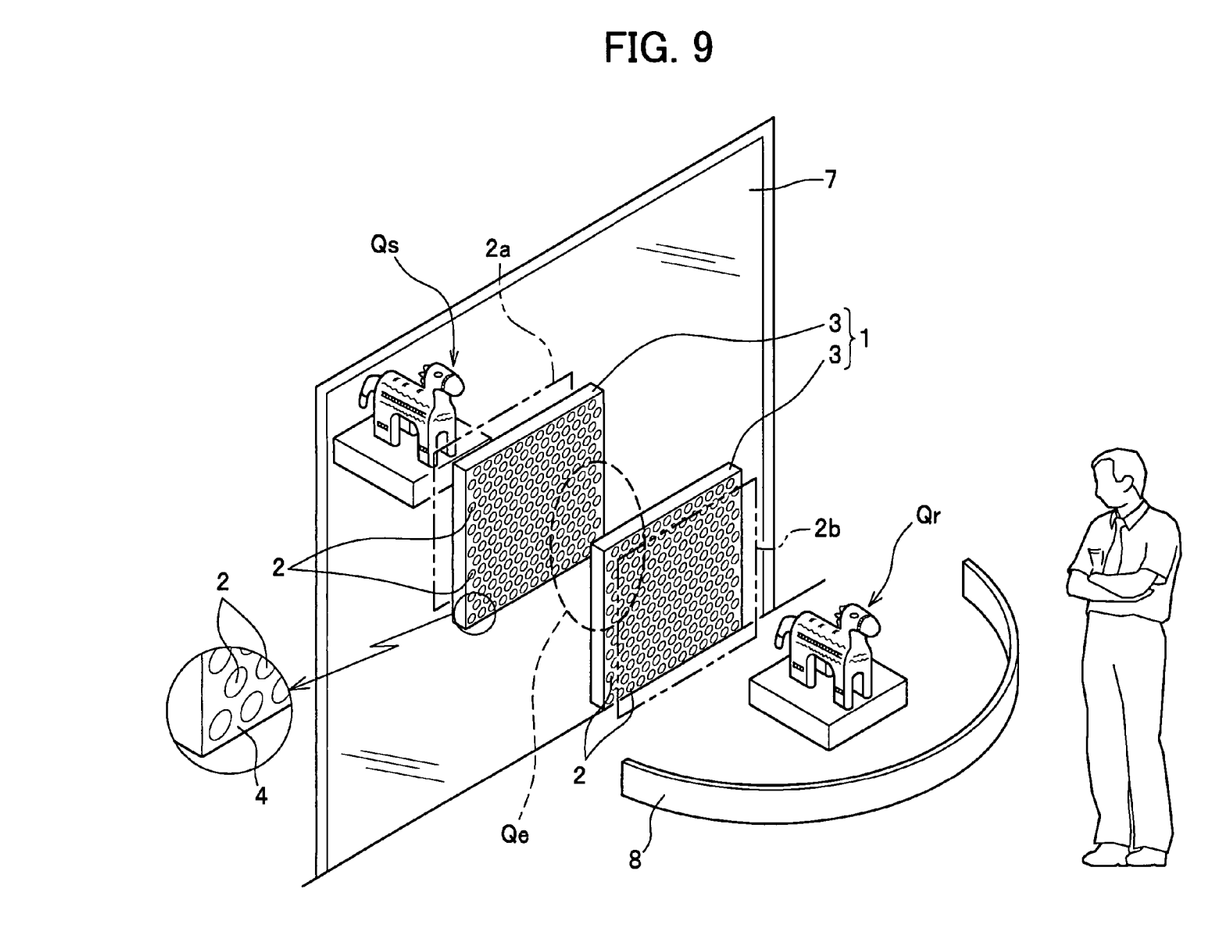
FIG. 9 is a schematic that shows a perspective view of an exhibit shown by using the three-dimensional image optical system.

Further embodiment of the present invention, which provides an application of the three-dimensional image optical system 1, 21, 31 and 41, will be explained. An example to show how the exhibit is place is shown in FIG. 9. The details are explained as follows. FIG. 9 schematically shows the positions and locations of the exhibit, the three-dimensional image optical system in a perspective view. The same notations and numbers used in FIG. 1 to 4 are used and no additional explanations are given for the same ones.

As shown in FIG. 9, the three-dimensional image optical system 1 composed of the two elementary image optical subsystems 3 and the subject which is a precious exhibit are put beyond the window glass 7 that segregates them from the visitors. The emission plane of the second elementary image optical subsystem 3 faces the visitors and the intermediate three-dimensional image Qe is reproduced beyond the window glass 7 and the three-dimensional image Qr is reproduced in the limit zone into which the visitors are kept off by a low fence 8. Each of the elementary image optical subsystems 3 has an array on which afocal optical elements 2 are arranged and the optical gobo element 4 are formed around the afocal optical elements 2. For the purpose of specific observation of the visitors, other three-dimensional image optical systems as 21, 31 and 41 can be used where cylindrical lenses 22a and 22b, a convex lens 32b and radial GRIN lenses 42a and 42b can be used.

By using the three-dimensional image optical system 1, 21 and 41, the 3D three-dimensional image can be reproduced and an exhibition with high fidelity is possible. Moreover, it can improve the working efficiency by precise visual recognition and the exhibition for the commercial goods can be strikingly stood out. An "eye-catching" effect can be obtained. It is possible to reproduce a three-dimensional erect image by using the three-dimensional image optical subsystem 31 and 51 which respectively comprise an elementary image optical subsystem 33.

It should be noted that the quantity of the afocal optical element pairs 2 (22 for cylindrical lenses or 42 for radial GRIN lenses) arrayed in the vertical alignment is not specifically limited as far as the subject Qs is reproduced into the intermediate three-dimensional image Qe. The length of the afocal optical element pair separation La can be changed for the purpose of use as far as the intermediate three-dimensional image Qe can be reproduced from Qs.

For each of the first and the second optical elements, a single optical component such as a convex lens, concave lens or radial GRIN lens is used. For the present invention, a combination of two different dispersion lenses for the single optical component can be used. By using such combination of the optical components, an achromatic optical system can be realized so that a clear three-dimensional image can be reproduced.

As explained above, the three-dimensional image optical system in the present invention has the following superior effects as described bellow.

The three-dimensional image optical system can reproduce the three-dimensional optical image which has the reverse convex and concave relation with the subjective image along the optical axis since the optical system reproduces the three-dimensional optical image of the subject by IP three-dimensional system, the longitudinal magnification is largely changed, the depth of the image is emphasized or shrunk in depth by decreasing the depth magnification.

By differing the incidence angle of the light that comes from the subject from the emitting angle of the emitting light, the distance from the subject to the three-dimensional image optical system and that from the three-dimensional image optical system to the three-dimensional optical image can be properly changed.

Because the three-dimensional image optical system has two convex lenses aligned with a common axis and the convex lens is aligned on a same plane, it is possible to reproduce a three-dimensional optical image on the common axis by emitting light under the a focal optical system. Because a focal lens pair of which two convex lenses have different focal length, it is possible to manufacture a variety of elementary image optical subsystems by alternating one of the paired lenses for the afocal optical element.

The three-dimensional image optical system as shown in FIG. 5 has a plurality of cylindrical lenses for afocal optical elements, therefore it is easy to handle and manufacture the plurality of elementary image optical subsystems. For the application of reproducing the horizontal parallax three-dimensional optical image, the present afocal optical elements can be used.

The three-dimensional optical image system can clearly reproduce the three-dimensional optical image by setting an optical gobo element for the adjacent afocal optical element.

For the first and the second optical components used for the afocal optical elements 2, radial GRIN lenses are used. Therefore, an ease and the flexibility in designing the afocal system are obtained by changing the length of the radial GRIN lenses. The use of the radial GRIN lenses can realize an easy mounting system of the optical component to construct the elementary image optical subsystem 3 as well.

The three-dimensional optical image system can reproduce a three-dimensional optical image that has dissolved the depth-reverse images. By using the elementary image optical subsystems which have different image distances, it is possible to change the position of the image of the three-dimensional images. It is further possible to adjust the position of the three-dimensional optical image can be adjusted by configuring the incidence angle and emitting angle of the elementary image optical subsystems.

The three-dimensional image optical system can reproduce the three-dimensional optical image in a remote distance from the actual subject, therefore it is possible for the viewers to recognize the position of the precious exhibit is close even it is exhibited further from the viewers. This assists a remote observation of the precious exhibit or harmful materials in nuclear plants. It is also possible the commercial goods displayed in the show window is reproduced outside the show window. The three-dimensional image can be reproduced closed to the observer by which it is possible to improve the working efficiency such that the exhibition for the commercial goods can strikingly stand out and the harmful material or substance can be monitored in a close view.

What is claimed is:

1. A three-dimensional image optical system comprising an elementary image optical subsystem that includes plural afocal optical elements placed in a planar array to form an elementary image optical subsystem, wherein each of said afocal optical elements has a first optical component and a second optical component both aligned at a distance such that an optical convergence area of said first optical component and an optical convergence area of said second optical component spatially coincide, and wherein said first and second optical components are surrounded and held by an optical gobo element.

2. A three-dimensional image optical system according to claim 1, wherein said first optical component and said second optical component are both aligned at a distance such that said first optical component and said second optical component are aligned in a common optical axis in which optical focal points of said first optical component and said second optical component coincide.

3. A three-dimensional image optical system according to claim 2, wherein a focal length of said first optical component and a focal length of said second optical component are different.

4. A three-dimensional image optical system according to claim 2, wherein said first optical component has a convergent focal length and said second optical component has a virtual focal length.

5. A three-dimensional image optical system according to claim 1, wherein at least one of said first optical component and said second optical component is a radial graded refractive index rod lens.

6. A three-dimensional image optical system according to claim 5, wherein optical length $Z_u$ of said first optical component is in a range of $0 > Z_u > P/2$ and different from optical length $Z_u$ of said second optical component which is in a range of $0 > Z_u > P/2$ where a normalized meridional serpentine period $P = 2\pi/A^{1/2}$ is defined by optical property parameter A of said first and second optical components.

7. A three-dimensional image optical system according to claim 5, wherein optical length $Z_u$ of said first optical component is in a range of $0 > Z_u > P/2$ and optical length $Z_u$ of said second optical component is in a range of $P/2 > Z_u > P$ where a normalized meridional serpentine period $P = 2\pi/A^{1/2}$ is defined by optical property parameter A of said first and second optical components.

8. A three-dimensional image optical system according to claim 2, wherein said first optical component and said second optical component are both held with an optical gobo element.

9. A three-dimensional image optical system according to claim 5,
wherein said first optical component and said second optical component are both held with an optical gobo element.

10. A three-dimensional image optical system according to claim 1,
wherein even quantity of said elementary image optical subsystems, which are placed in a series with distances so that an image reproduced by a foreside elementary image optical subsystem locates before a subsequent elementary image optical subsystem, are employed.

11. A three-dimensional image optical system according to claim 2,
wherein even quantity of said elementary image optical subsystems, which are placed in a series with distances so that an image reproduced by a foreside elementary image optical subsystem locates before a subsequent elementary image optical subsystem, are employed.

12. A three-dimensional image optical system according to claim 5,
wherein even quantity of said elementary image optical subsystems, which are placed in a series with distances so that an image reproduced by a foreside elementary image optical subsystem locates before a subsequent elementary image optical subsystem, are employed.

* * * * *